(12) United States Patent
Huang

(10) Patent No.: US 7,764,180 B2
(45) Date of Patent: Jul. 27, 2010

(54) ENVIRONMENT CONTROLLING SYSTEM AND METHOD THEREOF

(75) Inventor: Tung-Liang Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 746 days.

(21) Appl. No.: 11/512,254

(22) Filed: Aug. 30, 2006

(65) Prior Publication Data

US 2007/0057077 A1 Mar. 15, 2007

(30) Foreign Application Priority Data

Sep. 14, 2005 (TW) .............................. 94131618 A

(51) Int. Cl.
*G08B 23/00* (2006.01)
*G05D 23/19* (2006.01)

(52) U.S. Cl. ................................. 340/573.1; 236/91 C

(58) Field of Classification Search ............... 236/44 C, 236/91 C, 45; 62/208
See application file for complete search history.

(56) References Cited

U.S. PATENT DOCUMENTS

| | | | | |
|---|---|---|---|---|
| 2,573,455 A * | 10/1951 | Koontz | ............................ | 5/284 |
| 2,920,622 A * | 1/1960 | Steel | ....................... | 128/202.25 |
| 3,103,928 A * | 9/1963 | Broman | ........................ | 422/45 |
| 3,174,300 A * | 3/1965 | Webb | ......................... | 62/259.3 |
| 3,338,233 A * | 8/1967 | Grosholz et al. | ............... | 600/22 |
| 3,744,555 A * | 7/1973 | Fletcher et al. | ................ | 165/46 |
| 4,034,740 A * | 7/1977 | Atherton et al. | ................ | 600/22 |
| 4,430,828 A * | 2/1984 | Oglevee et al. | ................ | 47/17 |
| 4,750,474 A * | 6/1988 | Dukhan et al. | ................ | 600/22 |
| 5,054,686 A * | 10/1991 | Chuang | ...................... | 236/49.3 |
| 6,991,029 B2 * | 1/2006 | Orfield et al. | ................ | 165/237 |
| 2001/0045104 A1 * | 11/2001 | Bailey et al. | ................... | 62/510 |
| 2002/0173696 A1 * | 11/2002 | Kolarovic et al. | ............. | 600/22 |
| 2005/0121530 A1 * | 6/2005 | Song | ......................... | 236/44 C |
| 2005/0215844 A1 * | 9/2005 | Ten Eyck et al. | .............. | 600/22 |
| 2007/0023536 A1 * | 2/2007 | Baston | ...................... | 236/44 C |
| 2007/0138307 A1 * | 6/2007 | Khoo | .......................... | 236/1 C |
| 2009/0273468 A1 * | 11/2009 | Mazar et al. | ............ | 340/539.12 |
| 2009/0289799 A1 * | 11/2009 | Tivig et al. | ................ | 340/573.1 |

FOREIGN PATENT DOCUMENTS

| | | | |
|---|---|---|---|
| EP | 592796 A1 * | 4/1994 | |
| GB | 2260830 A * | 4/1993 | |

* cited by examiner

*Primary Examiner*—Frantz F. Jules
*Assistant Examiner*—Alexis K Cox
(74) *Attorney, Agent, or Firm*—Bacon & Thomas, PLLC

(57) ABSTRACT

This invention provides an environment controlling system and method thereof. The present system integrates and analyzes an individual's physiological and health information as well as environment information on a real-time basis to control environmental conditions and determine a living space beneficial to personal health. A healthy living space suitable for home care and disease management can be established by controlling environmental factors such as temperature, humidity, light, sound, etc.

41 Claims, 4 Drawing Sheets

ENVIRONMENT CONTROLLING SYSTEM AND METHOD THEREOF

FIELD OF THE INVENTION

The present invention relates to an environment controlling system and method thereof, more particularly to an environment controlling system and method that can be employed to build a healthy living environment that is suitable for home care or disease management.

BACKGROUND OF THE INVENTION

Due to a longer average life expectancy in the whole world, home care for the aged has become a major social issue. If properly handled, this can reduce social costs and fully utilize social resources. Therefore, a home environment controlling system has become a major issue in today's health care. The home care system can relieve the burden of health care staff and stabilize the physiological and mental states of the aged.

Moreover, environmental conditions are often major disease inducers. Therefore, the home care system can further be disposed in hospitals, hospice centers and even homes to build an environment suitable for patients and keep them away from pathogenic factors. The home care system detects and controls environmental factors (for example, temperature, humidity, etc.) that directly affect a person's physiological functions and also environmental factors (for example, illumination, loudness, etc.) that affect a person's mental states.

If medical equipment and apparatuses, mechanical and electrical systems and sensors are integrated into a home care system, it's desired to have regulatory strategies for the system, which are based on the health information and environmental conditions, to create a health-promoting living environment for home care or disease management.

SUMMARY OF THE INVENTION

To reach the aforementioned goals, it is the primary object of the present invention to achieve real-time regulation of a health-promoting living environment for home care or disease management. The present invention provides an environment controlling system and method thereof, capable of synthesizing the cared person's health information and environmental information in order to determine environmental conditions most suitable for the health of the cared person to achieve simultaneous and real-time regulation of environmental conditions.

To achieve the aforementioned objects, the environmental controlling system of the present system comprises at least a personal physiological measurement equipment to measure the physiological information of the cared for person, a central processing equipment having at least an input/output interface, a storage equipment, an analytical unit, an environment controlling equipment that is connected to the input/output interface of the central processing equipment to regulate environmental conditions, and an environmental measurement equipment that is connected to the input/output interface of the central processing equipment or the environment controlling equipment to measure environmental information. The analytical unit of the central processing equipment decides an optimum environmental condition on the basis of the cared for person's health information and environmental information from the input/output interface or the storage equipment, an' compares the optimum environmental condition with the environmental information to obtain regulation information; the central processing equipment can transmit the regulation information via the input/output interface to the environment controlling equipment to regulate the environmental conditions.

According to a preferred embodiment, the environmental controlling system of the present invention can further comprise a remotely controlled equipment that is connected to the input/output interface of the central processing equipment. The remotely controlled equipment can read the health, physiological or environmental information stored in the storage equipment, regulate the analytical unit or determine the regulation information.

The environment controlling method of the present invention comprises the steps of: providing a central processing equipment, at least a personal physiological measurement equipment, at least an environment controlling equipment and at least an environment measurement equipment, wherein the central processing equipment comprises an analytical unit, an input/output interface and a storage device. The central processing equipment is connected to the environment controlling equipment and the environment measurement equipment via the input/output interface; the storage device stores the health information of the cared person. Physiological and environmental information can be obtained by means of the personal physiological measurement equipment and the environment measurement equipment. The analytical unit of the central processing equipment determines an optimum environmental condition on the basis of the physiological, environmental and health information and compares the optimum environmental condition with the environmental information to obtain regulation information. The central processing equipment transmits the regulation information via the input/output interface to the environment controlling equipment that regulates environmental conditions on the basis of the regulation information.

The environment controlling system and method of the present invention can be applied to hospitals, hospice centers or homes such that the home environment of the cared for person can be automatically regulated to achieve a living environment optimal for the cared person on the basis of his/her physiological conditions, thereby creating a living environment suitable for home care and disease management.

BRIEF DESCRIPTION OF THE DRAWINGS

The above objects and advantages of the present invention will become more apparent with reference to the appended drawings wherein.

DETAILED DESCRIPTION OF THE INVENTION

Figure 1:
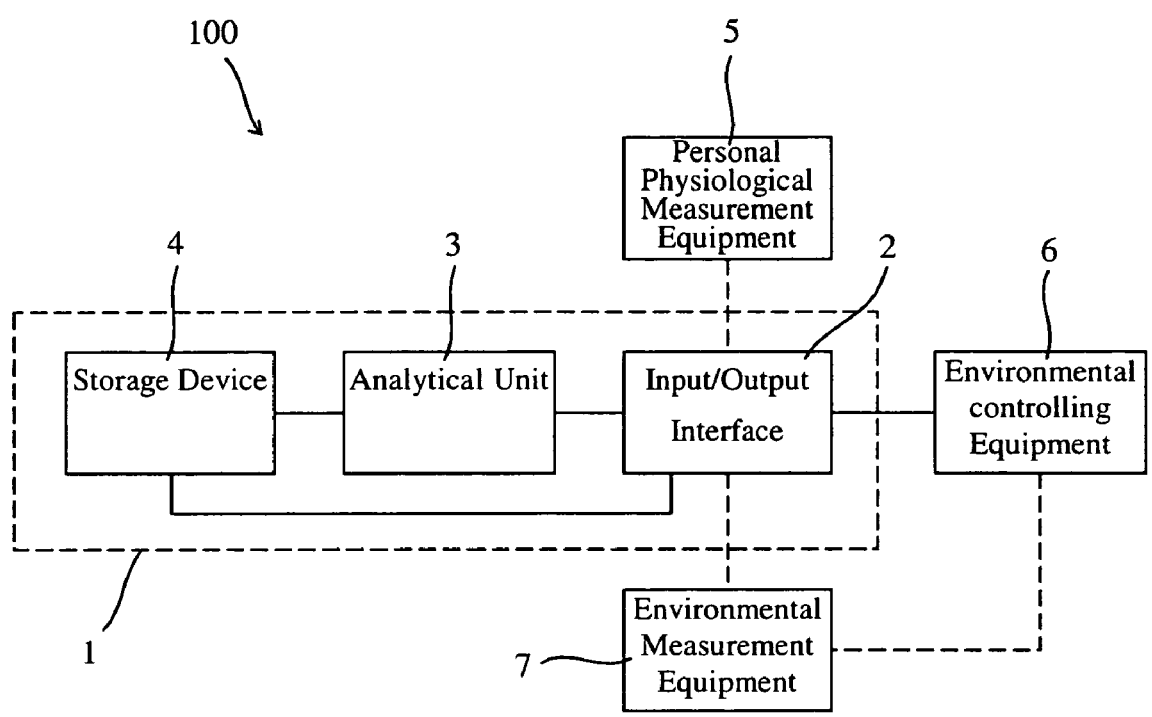
FIG. 1 is a schematic view of the environment controlling system of the present invention.

Referring to FIG. 1, the environment controlling system 100 of the present invention comprises at least a personal physiological measurement equipment 5 to measure the physiological information of the cared for person, a central processing equipment 1 comprising at least an input/output interface 2, a storage device 4 and an analytical unit 3, at least an environment controlling equipment 6 that is connected to the input/output interface 2 of the central processing equipment 1 to regulate environmental conditions, at least an environment measurement equipment 7 that is connected to the input/output interface 2 of the central processing equipment 1 or the environment controlling equipment 6, or is connected to input/output interface 2 and the environment controlling equipment 6 simultaneously to measure environmental information.

The analytical unit 3 of the central processing equipment 1 of the environment controlling system 100 analyzes the cared for person physiological information measured by the personal physiological measurement equipment 5, the environmental information measured by the environment measurement equipment 7, and the health information stored in the storage device 4 via the input/output interface 2, in order to decide an optimum environmental condition for the cared person. This optimum environmental condition is compared with the environmental information to obtain regulation information. Then the central processing equipment 1 can transmit the regulation information via the input/output interface 2 to the environment controlling equipment 6 to regulate the environmental conditions.

The "physiological information" referred to in the present invention means the values of the cared person's physiological conditions that have been measured, converted, analyzed, computed, or recorded, and it includes but is not limited to the cared for person blood pressure, pulse, body temperature, respiration rate, brain waves, blood oxygenation or cardiac electrical signals.

The "environmental information" referred to in the present invention means the values of the cared for person environmental conditions that have been measured, converted, analyzed, computed, or recorded, and it includes, but not limited to, air pressure, temperature, humidity, illumination, oxygen content, air cleanliness, wind speed or loudness.

The "regulation information" herewith refers to the adjusting values of the environmental controlling equipments. The central processing equipment computes the adjusting values from optimum environmental conditions and environmental information, then the central processing equipment transforms the adjusting values into commands and transmits commands via the input/output interface to the environmental controlling equipment. Finally, the environmental controlling equipments execute the commands to adjust the environmental conditions, such as reducing the temperature or raising the humidity.

In the environment controlling system 100, the storage device 4 stores the health information of the cared person. The "health information" referred to in the present invention includes the environmental factors that would induce discomfort or diseases to the cared person (for example, dust in the air, sudden changes or exceeding specific values of air temperature, air pressure, humidity, or loudness) and the environmental conditions suitable for the cared person's home care or treatment (for example, air pressure, temperature, humidity, illumination, oxygen content, air cleanness, wind speed or music within a specific range.)

When the embodiment of the central processing equipment 1 of the environment controlling system 100 is configured as a computer, the input/output interface 2 is an interface connected the computer to other hardwares in the scope of information engineering for information transmission between other equipments in the environment controlling system 100 and the central processing equipment 1. The input/output interface 2 can be a fixed interface connected to a motherboard or can be an external interface detachable from the motherboard. When the input/output interface 2 is an external interface, it can be configured as a remote end of the analytical unit 3 corresponding to the environment controlling system 100 so as to facilitate the exchange and transmission of information between the central processing equipment 1 and the personal physiological measurement equipment 5, and between the environment controlling equipment 6 and the environment measurement equipment 7. In summary, the input/output interface 2, the storage device 4 and the analytical unit 3 of the present invention can be disposed at the same or different geographical locations. For example, the input/output interface 2 can be disposed at the location (for example, home) of the cared person, whereas the storage device 4 or the analytical unit 3 can be disposed at another far-distant location (for example, hospitals, health care centers, hospice centers, etc.) The aforementioned three units can be connected via a far-distant or near-distant wireless or cable means. The embodiment of the input/output interface 2 of the present invention includes, but not limited to, the mechanical and electrical hardware technology that employs input/output interfaced (I/O interface), parallel ports, USB interface, visual interfaces, infra-red interfaces, cable transmission interfaces, wireless transmission interfaces and Bluetooth interfaces to transmit analog/digital information. In other words, the aforementioned interfaces can be employed to transmit information for connecting the central processing equipment 1 to the environment controlling equipment 6, the personal physiological measurement equipment 5 and the environment measurement equipment 7 of the environment controlling system 100 of the present invention. The analytical unit 3 is generally known as the hardware and software for computer computation and operation, with hardware including a central processing unit (CPU), memory, south/north bridge for hardware control, electric circuit board, etc. and with software including platform programs, for example, Windows Operating System or Linux and an environment controlling program installed on the system platform. The storage device 4 can be a data storage medium for computer, for example, a hard disk drive.

Figure 2:
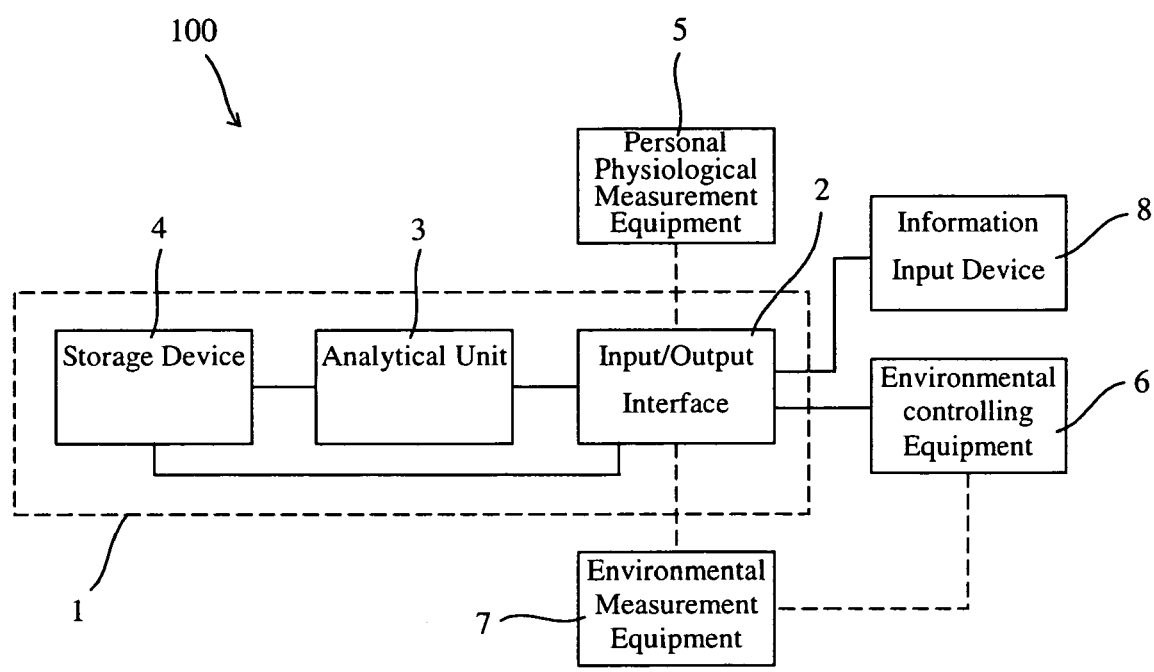
FIG. 2 is a schematic view showing a first embodiment of the environment controlling system of the present invention.

The environment controlling system 100 can further comprise an information input device 8 as shown in FIG. 2. The information input device 8 is connected to the input/output interface 2 and can be employed to input or modify the information into the central processing equipment 1. In some embodiments, when the personal physiological measurement equipment 5 is not directly connected to the input/output interface 2, the physiological information obtained from the personal physiological measurement equipment 5 can be input into the central processing equipment 1 via the information input device 8. The information input device 8 can also be employed to modify the health information stored in the storage device 4. When the central processing equipment 1 is configured as a computer, the common information input device 8 is a keyboard or a mouse.

The "personal physiological measurement equipment" referred to in the present invention includes a thermometer, sphygmomanometer, pulsimeter, electroencephalograph, pulse oximeter, spirometer or cardiograph employed to obtain the cared person's physiological information. In some embodiments, the personal physiological measurement equipment is not connected to the central processing equipment, and the measured physiological information can be manually input into the central processing equipment via the information input device. In a preferred embodiment, the personal physiological measurement equipment is connected to the input/output interface such that the central processing equipment can automatically obtain physiological information. Moreover, the "personal physiological measurement equipment" can be directly in contact with the cared person to measure related physiological information or indirectly measure the cared person's physiological information, for example, infrared sensing of the cared person's temperature, etc.

The "environment controlling equipment" referred to in the present invention includes hardware such as pneumatic controllers, air conditioners/heaters, humidity controllers, lighting fixture, oxygen machines, air purifiers, fans or music option and players that can be employed to regulate environment conditions. The hardware is connected to the central processing equipment and can receive the regulation information transmitted from the central processing equipment via the input/output interface, thereby starting or stopping the equipment on the basis of the regulation information.

The "environment measurement equipment" referred to in the present invention includes hardware such as indoor barometers, thermometers, hygrometers, photometers, oxygen analyzers, air analyzers, wind gauges, loudness gauges, etc., employed to measure environmental conditions. In some embodiments, the environment measurement equipment can be connected to the input/output interface such that the analytical unit can directly obtain the environmental information measured by the environment measurement equipment. In some embodiments, the environment measurement equipment can be connected to the environment controlling equipment, and the latter can be operated on the basis of the environmental information measured by the environment measurement equipment in order to keep the environmental conditions constant.

The storage device 4 of the environment controlling system 100 of the present invention can further store the health, physiological, or environmental information measured by the environment measurement equipment at different time points to act as the basis for the regulation of the environment controlling program referred to in the analytical unit 3.

Figure 3:
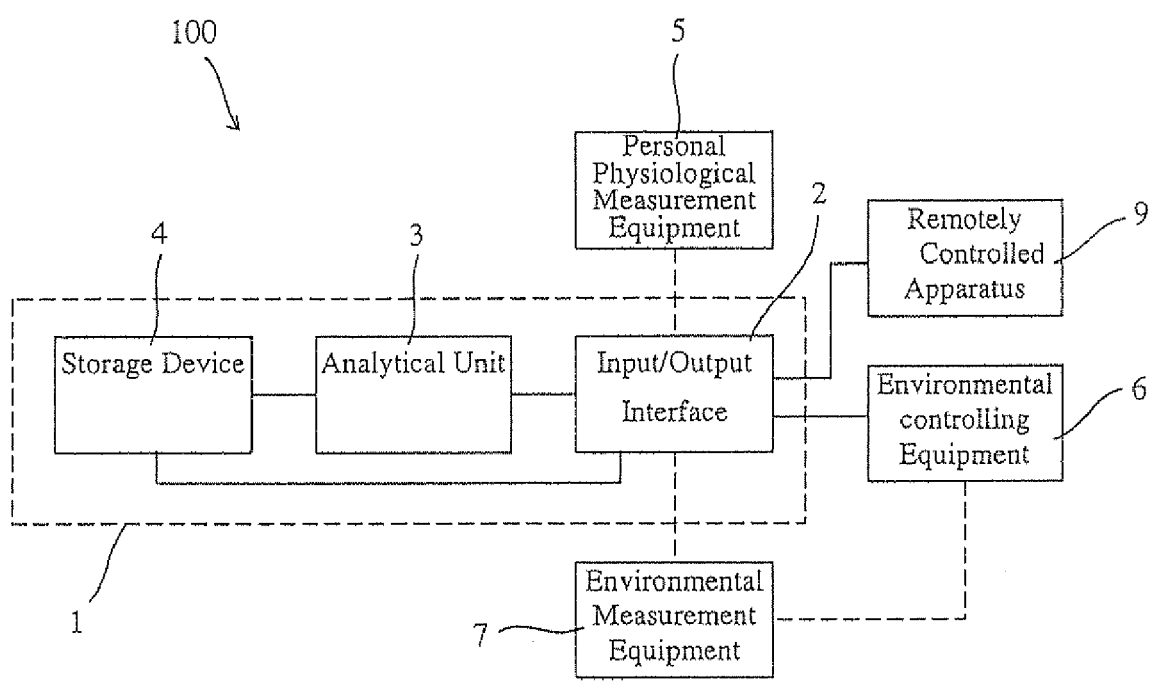
FIG. 3 is a schematic view showing a second embodiment of the environment controlling system of the present invention.

Referring to FIG. 3, the environment controlling system 100 of the present invention can further include a remotely controlled equipment 9 that is connected to the input/output interface 2 of the central processing equipment 1. When the central processing equipment 1 is configured as a server that allows the login of the remotely control equipment 9, the remotely control equipment 9 can read the health, physiological or environmental information stored in the storage device 4 at any time or transmit the health, physiological or environmental information stored in the storage device 4 to the remotely control equipment 9 according to the schedule arranged by the central processing equipment 1. Also, the remotely controlled equipment 9 can regulate the environment controlling program of the analytical unit 3 or directly determine regulation information to directly regulate the environmental conditions.

The "connection" referred to in the present invention means the transmission of information among equipment by means of cable or wireless transmission modules. Cable transmission modules include conventional bus lines, signal lines, cable network, telephone wires and optical fibers for analog or digital signal transmission. The wireless transmission modules include wireless transmission technology, such as HomeRF, the Bluetooth technology, infrared rays and IEEE 802x.

Therefore, the central processing equipment of the environment controlling system of the present invention can be independently disposed outside the living space of the cared for person and, via cable or wireless transmission technology, is connected to the personal physiological measurement equipment, environment controlling equipment and environment measurement equipment that are all disposed in the living space of the cared person.

The personal physiological measurement equipment, environment controlling equipment and environment measurement equipment disposed in the living space of the cared person can be connected to the input/output interface corresponding to one or a plurality of equipment connections of the central processing equipment. In other words, the personal physiological measurement equipment, environment controlling equipment and environment measurement equipment can be configured in the same or different connections so as to connect to the central processing equipment, via the corresponding input/output interface.

The present invention provides the environment controlling method, comprising the steps of providing a central processing equipment, at least a personal physiological measurement equipment, at least an environment controlling equipment, and at least an environment measurement equipment, wherein the central processing equipment comprises an analytical unit, an input/output interface and a storage device. The central processing equipment is connected to the environment controlling equipment and the environment measurement equipment via the input/output interface; the storage device stores the health information of the cared person. Physiological and environmental information can be obtained by means of the personal physiological measurement equipment and the environment measurement equipment. The analytical unit in the central processing equipment decides an optimum environmental condition on the basis of the physiological, environmental and health information, and then compares the optimum environmental condition with the environmental information to obtain regulation information. The central processing equipment transmits the regulation information via the input/output interface to the environment controlling equipment that regulates environmental conditions on the basis of the regulation information. The terms referred to in the aforementioned method are explained and defined as set forth in the system.

The "optimum environmental condition" referred to in the system or method thereof is determined by the environment controlling program of the analytical unit, wherein the environment controlling program comprises a plurality of parameters in connection with the critical values of the cared person's physiological information or environmental information, for example, the upper limits or the lower limits of the cared for person's heartbeat, respiration rate, blood pressure, body temperature, air temperature, and humidity. When the values of the cared for person's physiological information or environmental information exceed the configured critical values, the environment controlling program will decide an optimum environmental condition on the basis of physiological, environmental and health information. In other words, the optimum environmental condition can be both static and dynamic on the basis of physiological, environmental and health information and the analysis of environmental conditions.

It is to be understood that the following examples of the present invention should not be used to restrict the invention, and that all equivalent modifications and variations made without departing from the intent and import of the following examples are within the scope of the invention.

EMBODIMENT

Environmental Control of Bronchial Asthma-Affected Patients

Among respiratory diseases, bronchial asthma is a common but hard to be completely cure and disturbing chronic disease. The pathogen factor of bronchial asthma is primarily allergic reactions (approximately 75%) including dust in the air, pollens, animal hairs and peeling skin, some food, drugs and cosmetics. Other factors include sudden changes in polluted air, air temperature, humidity or air pressure or respiratory tract inflammation.

The symptoms of bronchial asthma at the onset of the disease are primarily sudden breakout, heightened heart beats, dry cough, difficulty in breathing, longer inhale time than exhale time, and special wheezing sounds. During care or treatment, the control of environmental factors (such as air cleanliness, air temperature and humidity) is very important to the bronchial asthma-affected patients. In case of changes to the aforementioned environmental factors, bronchial asthma symptoms develop, and abnormal changes happen to the patients' heartbeats and respiration.

The environment controlling system or method of the present invention can be applied to the environmental control of bronchial asthma-affected patients during care or treatment in order to help them speed up recovery, reduce the incidence or alleviate the conditions of the disease.

Figure 4:
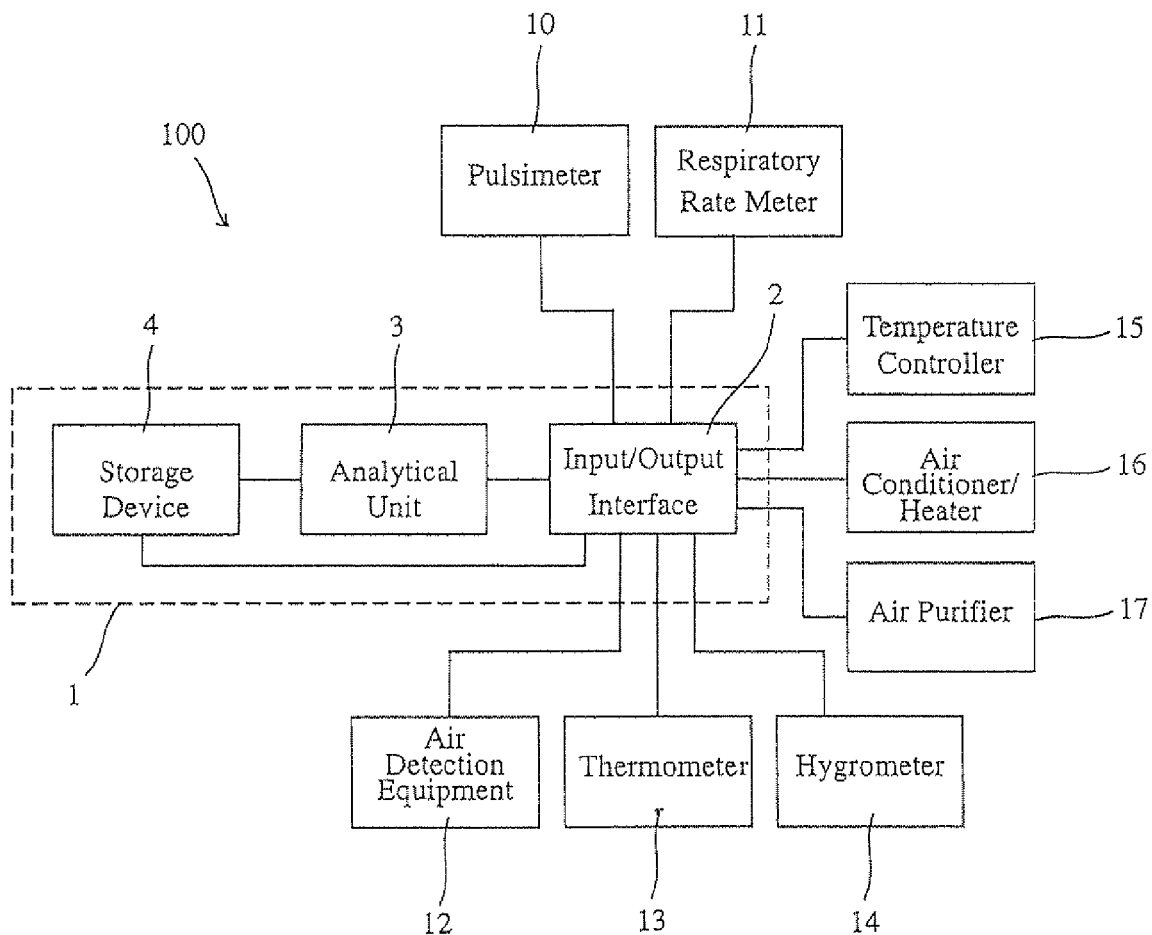
FIG. 4 is a schematic view showing the application of an embodiment of the environment controlling system of the present invention to the care of bronchial asthma-affected patients.

Referring to FIG. 4, personal health information is input and saved into the storage device 4 of the central processing equipment 1. Health information includes the environmental factors (such as exceeding specific values of dust in air, pollens, animal hairs and peeling skin, and sudden changed in or exceeding specific values of air temperature, humidity or air pressure) that stimulate the incidence and the range of environmental conditions suitable for the patient's home care or treatment (such as room temperature within 23~27° C., 40-60% humidity, etc.)

Then the patient's heartbeat and respiratory rate are measured by a pulsimeter 10 and a spirometer 11, and an air detection device 12, a thermometer 13, and a hygrometer 14 are employed to monitor air cleanliness, air temperature and humidity, respectively. The pulse rate of a normal person lies between 60 and 100, and the respiratory rate lies between 8 and 20. The pulsimeter 10 and spirometer 11 are employed to measure the patient's heartbeat and respiratory rate before the onset of the disease in order to establish the relationship of the patient's heartbeat, respiratory rate, and physiological durations (including sleeping, awakening, during activity, etc.) before the onset of the disease and store the aforementioned information in the storage device 4 as the basis for comparison.

When abnormal heartbeats and respiratory rate are found (for example, significantly heightened heartbeats or respiratory rate in comparison with the heartbeats and respiratory rate at the same physiological duration prior to the onset of the patient's disease), the environment controlling program of the analytical unit 3 of the central processing equipment 1 will compare the parameters (such as the dust particles, air temperature and humidity) with the personal health information stored in the storage device 4 to decide an optimum environment for the patient's physiological conditions and decide a regulation strategy after comparing it with the existing environmental conditions, thereby starting the environment controlling equipment (such as a humidity controller 15, air conditioner/heater 16, air purifier 17 as shown in FIG. 4) to alleviate the patient's discomfort (such as heightened heartbeats and respiratory rate.) When the system is regulating the environment, it simultaneously monitors and analyzes the patient's physiological reactions (for example, heartbeats and respiratory rate) as the basis for further regulation so as to achieve an optimum environment for the patient's comfort. For example, when sudden changes in the patient's respiratory rate are found to be caused by an increase in pollen particles, the central processing equipment 1 will start the air purifier 17 to reduce the pollen particles in air. If the analysis results of the analytical unit 3 show that the patient's abnormal physiological conditions are caused by the combined effects of a sudden rise in air temperature and an increase in pollen particles, the central processing equipment 1 will simultaneously start the air-conditioner/heater 16 and the air purifier 17 to regulate the environment and patient care. In summary, the regulation information can start the operations of a single environment-controlling configuration for an environment controlling equipment or a multiple environment-controlling configuration for a plurality of environmental equipments on the basis of the importance of environmental parameters.

In summary, by integrating medical equipment and apparatuses, mechanical and electrical systems, sensors, and controllers, optimum environmental controlling strategies for patients can be estimated by algorithms on the basis of health information and environmental conditions to create a health-promoting living environment for home care or disease management and keep away from the environmental factors that induce diseases.

Other Embodiments

It is to be understood that the foregoing characteristics of the present invention disclosed in the specification may be combined with other methods, and each characteristic disclosed in the present specification may optionally be replaced by characteristics of the same, equivalent or similar intent and import. Therefore, unless otherwise for specially salient characteristics, all the characteristics disclosed in the present specification are only examples of the same or similar characteristics.

It is to be understood that the foregoing description of the present invention should not be used to restrict the invention, and that all equivalent modifications and variations made without departing from the intent and import of the foregoing description should be included in the following claims.

What is claimed is:

1. An environment controlling system, comprising:
   at least a persona physiological measurement equipment to continuously measure a physiological information of cared for persons, wherein said physiological information comprises physiological information measured before and during the onset of a disease or abnormal physiological reaction of cared for persons,
   a central processing equipment having at least an input/output interface, a storage device, and an analytical unit,
   at least an environment controlling equipment connected to said input/output interface of said central processing equipment to regulate environmental conditions; and
   at least an environmental measurement equipment connected to said input/output interface of said central processing equipment or said environment controlling equipment to measure environmental information;

wherein said physiological information is measured to establish the relationship between physiological information before and during the onset of a disease or abnormal physiological condition and physiological durations of the cared for persons;

as a disease or an abnormal physiological condition is found, the analytical unit compares said physiological information with obtained (or pre-saved) health information and environmental information from said input/output interface or said storage device to find out what triggered the onset of the disease or abnormal physiological reaction and decide an optimum environmental condition;

the analytical unit also compares said environmental information with said optimum environmental condition to obtain a regulation information, which can be transmitted by said central processing equipment via said input/output interface to said environment controlling equipment to regulate environmental conditions.

2. The environment controlling system as claimed in claim 1, wherein said physiological information includes blood pressure, pulse, body temperature, respiration rate, brain waves, blood oxygenation or cardiac electrical signals.

3. The environment controlling system as claimed in claim 1, wherein said environmental information includes air pressure, air temperature, humidity, illumination, oxygen content, air cleanliness, wind speed or loudness.

4. The environment controlling system as claimed in claim 1, wherein said storage device stores said health information of the cared for person.

5. The environment controlling system as claimed in claim 4, wherein said health information includes the environmental factors that induce discomfort or diseases of the cared for person and the environmental conditions suitable for the cared for person's home care or treatment.

6. The environment controlling system as claimed in claim 1, wherein said personal physiological measurement equipment is connected to said input/output interface of said central processing equipment such that said central processing equipment can automatically obtain said physiological information.

7. The environment controlling system as claimed in claim 1, further comprising an information input device that is connected to said input/output interface.

8. The environment controlling system as claimed in claim 7, wherein said information input device is employed to input said physiological information measured by said personal physiological measurement equipment into said central processing equipment.

9. The environment controlling system as claimed in claim 7, wherein said information input device is employed to input said health information of the cared for person into said central processing equipment.

10. The environment controlling system as claimed in claim 7, wherein said information input device is a keyboard or a mouse.

11. The environment controlling system as claimed in claim 1, wherein said personal physiological measurement equipment includes a thermometer, sphygmomanometer, pulsimeter, electroencephalograph, pulse oximeter, spirometer or cardiograph.

12. The environment controlling system as claimed in claim 1, wherein said environment measurement equipment includes indoor barometers, thermometers, hygrometers, photometers, oxygen analyzers, air analyzers, wind gauges or loudness gauges.

13. The environment controlling system as claimed in claim 1, wherein said environment measurement equipment is connected to said input/output interface of said central processing equipment such that said central processing equipment can obtain said environmental information.

14. The environment controlling system as claimed in claim 1, wherein said environment measurement equipment is connected to said environment controlling equipment such that said central processing equipment can obtain the environmental information from said environment controlling equipment.

15. The environment controlling system as claimed in claim 1, wherein said environment controlling equipment includes a pneumatic controller, air conditioner/heater, humidity controller, lighting fixture, oxygen machine, air purifier, fan or music option and player.

16. The environment controlling system as claimed in claim 1, wherein said storage device can further store said health, physiological or environmental information.

17. The environment controlling system as claimed in claim 16, further comprising a remotely controlled equipment that is connected to said input/output interface of said central processing equipment and that can read said health, physiological or environmental information stored in said storage device or can adjust said analytical unit or decide said regulation information.

18. The environment controlling system as claimed in claim 1, wherein said central processing equipment is disposed inside the living space of the cared person.

19. The environment controlling system as claimed in claim 1, wherein said central processing equipment is disposed outside the living space of the cared person.

20. The environment controlling system as claimed in claim 1, wherein said input/output interface, said analytical unit and said storage device of said central processing equipment are disposed on the same space.

21. The environment controlling system as claimed in claim 1, wherein said input/output interface, said analytical unit and said storage device of said central processing equipment are disposed on different spaces.

22. The environment controlling system as claimed in claim 1, wherein said connection is based on cable transmission modules or wireless transmission modules.

23. An environment controlling method, comprising the steps of:
providing a central processing equipment, at least a personal physiological measurement equipment, at least an environment controlling equipment, and at least an environment measurement equipment, wherein said central processing equipment comprises an analytical unit, and input/output interface and a storage device;

said central processing equipment is connected to said environment controlling equipment and said environment measurement equipment via said input/output interface thereof;

said storage device stores health information of the cared for person;

continuously obtaining physiological and environmental information by means of said personal physiological measurement equipment and said environment measurement equipment, wherein said physiological information comprises physiological information measured before and during the onset of a disease or abnormal physiological reaction of cared for persons and is measured to establish the relationship between physiological information before and during the onset of a disease or abnormal physiological condition and physiological durations of the cared for persons;

as a disease or an abnormal physiological condition is found, finding out what triggered the onset of the disease or abnormal physiological reaction and deciding an optimum environmental condition by comparing said physiological information with obtained (or pre-saved) health information and environmental information from said input/output interface or said storage device by said analytical unit of said central processing equipment;

comparing said optimum environmental condition with said environmental information to obtain regulation information by said analytical unit of said central processing equipment;

transmitting said regulation information by said central processing equipment to said environment controlling equipment via said input/output interface thereof; and regulating environmental conditions by said environment controlling equipment on the basis of said regulation information.

24. The environment controlling method as claimed in claim 23, wherein said physiological information includes blood pressure, pulse, body temperature, respiration rate, brain waves, blood oxygenation or cardiac electrical signals.

25. The environment controlling method as claimed in claim 23, wherein said environmental information includes air pressure, temperature, humidity, illumination, oxygen content, air cleanliness, wind speed or loudness.

26. The environment controlling method as claimed in claim 23, wherein said health information includes the environmental factors that induce discomfort or disease for the cared for person and the environmental conditions suitable for the cared person's home care or treatment.

27. The environment controlling method as claimed in claim 23, wherein said personal physiological measurement equipment is connected to said input/output interface of said central processing equipment such that said central processing equipment can automatically obtain said physiological information.

28. The environment controlling method as claimed in claim 23, further comprising the step of connecting an information input device to said input/output interface.

29. The environment controlling method as claimed in claim 28, wherein said information input device is employed to input said physiological information measured by said personal physiological measurement equipment into said central processing equipment.

30. The environment controlling method as claimed in claim 28, wherein said information input device is employed to input said health information of the cared for person into said central processing equipment.

31. The environment controlling method as claimed in claim 28, wherein said information input device is a keyboard or a mouse.

32. The environment controlling method as claimed in claim 23, wherein said personal physiological measurement equipment includes a thermometer, sphygmomanometer, pulsimeter, electroencephalograph, pulse oximeter, spirometer or cardiograph.

33. The environment controlling method as claimed in claim 23, wherein said environment measurement equipment includes indoor barometers, thermometers, hygrometers, photometers, oxygen analyzers, air analyzers, wind gauges or loudness gauges.

34. The environment controlling method as claimed in claim 23, wherein said environment measurement equipment is connected to said input/output interface of said central processing equipment such that said central processing equipment can obtain said environmental information.

35. The environment controlling method as claimed in claim 23, wherein said environment measurement equipment is connected to said environment controlling equipment such that said central processing equipment can obtain the environmental information from said environment controlling equipment.

36. The environment controlling method as claimed in claim 23, wherein said environment controlling equipment includes a pneumatic controller, air conditioner/heater, humidity controller, lighting fixture, oxygen machine, air purifier, fan or music option and player.

37. The environment controlling method as claimed in claim 23, wherein said storage device can further store said health, physiological or environmental information.

38. The environment controlling method as claimed in claim 37, further comprising the step of connecting a remotely controlled equipment to said input/output interface of said central processing equipment, wherein said remotely controlled equipment can read said health, physiological or environmental information stored in said storage device, or adjust said analytical unit or decide said regulation information.

39. The environment controlling method as claimed in claim 23, wherein said connection from said central processing equipment to said environment controlling equipment via said input/output interface is based on cable transmission modules or wireless transmission modules.

40. The environment controlling system as claimed in claim 1, wherein said optimum environmental condition is static or dynamic on the basis of physiological, environmental and health information and the analysis of environmental conditions.

41. The environment controlling method as claimed in claim 23, wherein said optimum environmental condition is static or dynamic on the basis of physiological, environmental and health information and the analysis of environmental conditions.

* * * * *